United States Patent Office 3,328,413
Patented June 27, 1967

3,328,413
PROCESS FOR BIPYRIDYLS
Frank Raymond Bradbury and Alastair Campbell, Widnes, England, assignors to Imperial Chemical Industries Limited, London, England, a corporation of Great Britain
No Drawing. Filed July 9, 1962, Ser. No. 208,566
Claims priority, application Great Britain, July 17, 1961, 25,781/61
10 Claims. (Cl. 260—296)

This invention relates to an organic chemical process useful for the manufacture of organic bases, and more particularly for the manufacture of bipyridyls.

It is known to prepare bipyridyls, usually as mixtures of isomers, by oxidation of the product obtained by interaction of sodium and pyridine. An alternative method, described in our co-pending U.S. application Serial No. 193,627, filed May 9, 1962 is that of oxidising the interaction product of magnesium and pyridine. In these processes, the interaction of the metal and the pyridine may be carried out in the presence of a diluent, which is preferably a solvent for the bipyridyls and the metal-pyridine interaction product. Pyridine is especially suitable for this purpose, and an excess of this material can be used to act as this diluent. Pyridines are expensive materials, however, and it is therefore desirable that the quantity used for a given production of bipyridyls should be kept as low as possible, but the majority of common and inexpensive solvents and diluents are not entirely suitable for use in place of the excess pyridine. In the case of the magnesium-pyridine interaction in particular, the majority of common solvents are unsuitable because they tend to impede the interaction.

We have now found that an especially valuable diluent for use in making metal-pyridine interaction products, and especially in making magnesium-pyridine interaction products, is an N:N-dialkylarylamine. This diluent allows the amount of the expensive pyridine used to be kept to a minimum without detriment to the reaction. Also, this diluent is in many instances a better solvent than pyridine for the intermediate metal-pyridine interaction product, so that settling or crystallisation of the intermediate from the reaction mixture during transfer from one vessel to another, as in a continuous process, is minimised. As any undissolved intermediate on the walls of the reactor may escape oxidation, the improved solubility has the further advantage of enabling the oxidation stage (in which the metal-pyridine interaction product is converted to bipyridyls) to be carried out more smoothly and completely.

Thus according to our invention we provide a process for the manufacture of a metal-pyridine interaction product wherein the interaction of the metal and the pyridine is carried out in the presence of an N:N-dialkylarylamine. This process is especially applicable to the manufacture of bipyridyls by a process wherein the metal-pyridine interaction product so formed is oxidised, to form the bipyridyls.

Apart from the addition of the N:N-dialkylarylamine, the general conditions and requirements for the metal-pyridine interaction require substantially no alteration. The principal difference is that the proportion of the pyridine to be used may be reduced considerably and may even be reduced substantially to that required stoichiometrically for the interaction (approximately 1 gram mole per gram equivalent of metal, for example 1 gram mole per gram atom of alkali metal or 2 gram moles per gram atom of magnesium). Some excess of the pyridine may be used if desired, however, but this need not be very great.

The metal used in the formation of the metal-pyridine interaction product may be an alkali metal, or magnesium. Of the alkali metals, sodium is more commonly used and is particularly efficient; other alkali metals, for example potassium and lithium, may be used in place of sodium, though these are less convenient and efficient. The alkali metals may be used in the form of finely divided dispersions or suspensions or may be dispersed in the molten state through the interaction mixture by vigorous stirring. Magnesium may be used most conveniently in a form having a large surface area, for example turnings or powder, and the surface of the metal should be as clean as possible to facilitate reaction.

The pyridine used should be as free as possible from any substituent or impurity (for example piperidine) which can take part in any undesirable side reaction with the metal (or with the reaction initiator if one is used). The process of our invention is especially applicable to the products of metal interaction products from pyridine itself. Pyridines containing hydrocarbon radicals (particularly alkyl radicals for example methyl and/or ethyl radicals) may also be used, for example picolines and lutidines.

The N:N-dialkylarylamine should also be substantially free from any substitutent or impurity which can take part in an undesired side-reaction with the metal or the pyridine. It is preferably one in which the alkyl substituents on the nitrogen atom contain up to 4 carbon atoms each, as these are more easily accessible commercially and have boiling points which are most convenient in use and in subsequent recovery operations. Those in which the alkyl substitutents on the nitrogen atom are methyl and/or ethyl radicals are particularly readily available, and on general grounds of cheapness and efficiency we prefer to use dimethylaniline. Those N:N-dialkylarylamines in which one or both of the N-alkyl substituents contains more than 4 carbon atoms may also be used if desired, however, for example those containing the alkyl groups from any conveniently available aliphatic alcohols or mixtures thereof, for example hexyl, octyl or dodecyl groups. For the purposes of the present invention, we also intend the term "alkyl group" to include aralkyl groups, for example the benzyl group.

Thus there may be mentioned N:N-dimethyl-, N:N-diethyl-, N - methyl - N - ethyl-, and N:N-di-n-propyl-anilines, the corresponding derivatives of the ortho, meta or para toluidines, anisidines or phenetidines, of the xylidines, or mixtures of these. To facilitate the interaction it is preferred that the N:N-dialkylarylamine should be liquid at the temperatures encountered in the interaction process, or at least should be substantially completely soluble in the pyridine used or in the interaction mixture.

The proportions of N:N-dialkylarylamine to be used may vary with the state of reactivity of the particular metal used, but are preferably between 0.5 and 2 moles of the N:N-dialkylarylamine for each mole of pyridine used. Smaller proportions have less value because the saving of pyridine is negligible if pyridine is a major constituent of the mixture and the improved solvent properties of the diluent are of little benefit if it is present in only small proportions. Greater proportions tend to cause a high degree of dilution and make the bulk of material to be handled in the process unduly large; and so are usually economically unattractive, but may be used if so desired.

The pyridine and the N:N-dialkylarylamine should preferably be substantially dry.

The general conditions for the interaction of magnesium and a pyridine are those more fully described in co-pending U.S. application Serial No. 193,627. In particular, the interaction is preferably carried out at a temperature in the range 90° C. to 120° C., and the interaction can be initiated by materials which induce the formation of free radicals in the pyridine-magnesium mixture (especially by dispersions of alkali metals such as sodium, lithium or potassium, or by halogens such as bromine or iodine).

The general conditions for interaction of an alkali metal and the pyridine may be varied considerably as the metals are so active, and may range from atmospheric temperatures to the boiling point of the reaction mixture. The usual precautions for handling these metals should be taken, and the rates of mixing of the metal, pyridine and diluent should be adjusted so as to avoid overheating of the mixture.

The conversion of the metal-pyridine interaction products to bipyridyls can be effected by oxidation, and this need not be altered substantially on account of the diluent. Oxidation can be conveniently carried out using oxygen or oxygen diluted with an inert gas such as nitrogen (for example air). Oxidation can also be carried out using chlorine, optionally diluted with an inert gas such as nitrogen. The general method of oxidation for the magnesium interaction product is more fully described in our co-pending application Serial No. 193,627, and this can be applied to other metal-pyridine interaction products.

The isolation of the bipyridyls can be carried out by conventional techniques, for example fractional distillation, extraction with acid and treatment of the acid extracts with alkali, fractional crystallisation, or combinations of such techniques. Due allowance should be made in the isolation technique for the presence of the basic dialkylarylamine as an additional component, for example in any fractional distillation or crystallisation technique used, but any variations required are those commonly employed in the art for dealing with such mixtures.

Commonly a mixture of isomeric bipyridyls is produced by the oxidation of the metal-pyridine interaction products, the principal constituents being the 2:2'-, 2:4'- and 4:4'- isomers or such of these as are permitted by the structure of the pyridine used as starting material. The 4:4'-isomer usually predominates. The mixture of isomers may be used as such, or may be separated by known methods so as to obtain individual isomers.

The bipyridyls are useful as intermediates in chemical synthesis and in the manufacture of herbicidal products.

The invention is illustrated but not limited by the following examples in which the parts and percentages are by weight.

*Example 1*

A mixture of 12.2 g. (0.5 mole) of magnesium turnings and 158 g. (2.0 mole) of pyridine was heated with stirring under refluxing conditions, and reaction was started by addition of a catalytic amount of a finely divided dispersion of sodium in trimethylbenzene. To the refluxing mixture was added 50 g. (0.4 mole) of N:N-dimethylaniline and refluxing was continued for 4 hours, after which time a further 50 g. (0.4 mole) of N:N-dimethylaniline were added and the mixture was refluxed for 2 hours more. The resulting reaction mixture was then oxidised at a temperature between 100° C. and 105° C. by passing air through it at 20 litres per hour for 5½ hours. The product was then cooled, and was found to contain 85 g. of unchanged pyridine, 1.1 g. of 2:2'-bipyridyl, 0.3 g. of 2:4'-bipyridyl and 29.7 g. of 4:4'-bipyridyl. This corresponds to a yield of 40% of theory of total bipyridyls based on the magnesium used (43% of theory based on the pyridine consumed), 95% of the bipyridyls being the 4:4'-isomer.

*Example 2*

A mixture of 12.2 g. (0.5 mole) of magnesium turnings, 79 g. (1.0 mole) of pyridine and 74.6 g. (0.5 mole) of N:N-diethylaniline was stirred and heated under reflux conditions, and reaction was started by addition of a small amount of a finely divided dispersion of sodium in trimethylbenzene. Refluxing was then continued for 5 hours, after which time the mixture was cooled to 80° C. and oxidised by passing air through it at 20 litres per hour. The oxidised product was found to contain 12 g. of pyridine, 1.6 g. of 2:2'-bipyridyl and 18.4 g. of 4:4'-bipyridyl. This corresponds to a yield of 26% of theory of the total bipyridyls based on the magnesium used (30% of theory based on the pyridine consumed), 92% of the bipyridyls being the 4:4'-isomer.

*Example 3*

A mixture of N:N-diethylaniline (149 parts, 1.0 mole), pyridine (197.5 parts, 2.5 moles) and sodium metal (23.5 parts, 1.02 atomic equivalents) were heated together at 100° C. for 135 minutes, and the reaction mixture was then air blown at 100° C. for 6½ hours, followed by addition of 40 parts of water and a further air-blowing at 100° C. for 1 hour. The organic and aqueous phases of the reaction mixture were then separated at 100° C. and the organic layer (comprising 364 parts) was found by analysis to contain 0.2% of 2:2'-bipyridyl, 2.8% of 2:4'-bipyridyl and 8.5% of 4:4'-bipyridyl. This represents a 39.5% efficiency of 4:4'-bipyridyl formation based on the sodium.

Repetition of the process of this example using 186 parts (1.25 moles) of diethylaniline, 158 parts (2 moles) of pyridine and 23.5 parts (1.02 atomic equivalents) of sodium metal, gave 368 parts of an organic product phase which was found by analysis to contain 0.1% of 2:2'-bipyridyl, 1.9% of 2:4'-bipyridyl and 7.9% of 4:4'-bipyridyl. This represents a 37.2% efficiency of 4:4'-bipyridyl formation based on the sodium.

*Example 4*

A mixture of 186 parts (1.25 moles) of N:N-diethylaniline, 158 parts (2 moles) of pyridine and 23 parts (1 atomic equivalent) of sodium metal was heated at 115° C. for 135 minutes, and the reaction mixture was then air-blown at 100° C. for 6½ hours, followed by addition of 40 parts of water and further air-blowing for 1 hour. The organic and aqueous phases of the reaction mixture were then separated, and the organic layer (comprising 364 parts) was found by analysis to contain 4:4'-bipyridyl in an amount corresponding to a 45.7% conversion efficiency based on the pyridine consumed in the reaction.

*Example 5*

A mixture of 197 parts of N:N-diethylaniline (containing 0.046% water, as determined by analysis), 195.7 parts of pyridine (containing 0.005% of water, as determined by analysis), and 12 parts of magnesium turnings was heated for 150 minutes at 115° C. The reaction mixture was then air-blown for 2 hours, after which time a small amount of water was added and the air blowing was continued until no further change of colour occurred. The reaction product was found by analysis to contain 4:4'-bipyridyl in an amount corresponding to a 30% efficiency of conversion based on the pyridine consumed in the reaction.

What we claim is:

1. In a process for the manufacture of a bipyridyl wherein a compound selected from the group consisting of pyridine and alkyl-substituted pyridine is reacted with a metal selected from the group consisting of lithium, sodium, potassium and magnesium to form a metal-pyridine interaction product followed by oxidation of said product to give the desired bipyridyl, the improvement which comprises reacting said compound and said metal in the presence of a solvent selected from the group consisting of N:N - dialkylarylamines and N:N - diaralkylarylamines wherein the alkyl and aralkyl substitutents have from one to twelve carbon atoms each.

2. In a process involving the reaction of a metal selected from the group consisting of lithium, sodium, potassium and magnesium with a compound selected from the group consisting of pyridine and alkyl-substituted pyridine, the improvement which comprises carrying out said reaction in the presence of a solvent selected from the group consisting of N:N-dialkylarylamines and N:N-diaralkylarylamines wherein the alkyl and aralkyl substituents have from one to twelve carbon atoms each.

3. Process as claimed in claim 1 wherein the amount of pyridine is substantially the stoichiometric amount needed for reaction with said metal.

4. Process as claimed in claim 3 wherein said N:N-dialkylarylamine is liquid at the reaction temperature and is selected from the group consisting of N:N-dialkylanilines and the corresponding toluidines, anisidines, phenetidines and xylidines wherein the alkyl has from 1–4 carbon atoms.

5. Process as claimed in claim 1 wherein the metal is sodium.

6. Process as claimed in claim 1 wherein the metal is magnesium.

7. Process as claimed in claim 1 wherein said compound is pyridine.

8. Process as claimed in claim 7 wherein the N:N-dialkylarylamine contains, as N-substitutents, alkyl groups of 1 to 4 carbon atoms each.

9. Process as claimed in claim 8 wherein the N:N-dialkylarylamine is N:N-dimethylaniline.

10. Process as claimed in claim 9 wherein the proportion of the N:N-dialkylarylamine is between 0.5 and 2 moles for each mole of the pyridine used.

References Cited

Badger et al., J. Chem. Soc., pp. 616–20 (1956).
Emmert, Ber. deut. Chem., vol. 49, pp. 1060–2 (1916).
MacArdle, Use of Solvents, page 3 and page 107 (1925).
Setton, Compt. Rend., vol. 224, pp. 1205–7 (1957).

ALEX MAZEL, *Primary Examiner.*

NICHOLAS S. RIZZO, HENRY R. JILES, *Examiners.*

D. M. KERR, DONALD G. DAUS,
*Assistant Examiners.*